United States Patent
Rossin et al.

(10) Patent No.: US 8,877,677 B1
(45) Date of Patent: Nov. 4, 2014

(54) FILTRATION MEDIA AND PROCESS FOR THE REMOVAL OF HAZARDOUS MATERIALS FROM AIR STREAMS

(75) Inventors: Joseph A. Rossin, Columbus, OH (US); Gregory W. Peterson, Belcamp, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 448 days.

(21) Appl. No.: 12/914,334

(22) Filed: Oct. 28, 2010

(51) Int. Cl.
*B01J 20/00* (2006.01)

(52) U.S. Cl.
USPC ........................................... 502/400

(58) Field of Classification Search
CPC ............... B01J 20/3204; B01J 20/3236; B01J 20/3248; B01J 20/3214; B01J 20/28064; B01J 20/28011; B01J 20/0211; B01D 39/2068; B01D 39/2072
USPC .......... 502/406, 400, 401, 407; 423/604, 606, 423/607, 608, 594.17, 594.19, 594.16
See application file for complete search history.

(56) References Cited

FOREIGN PATENT DOCUMENTS

WO   WO 2008/055126   *   5/2008   ............. B01D 39/00

OTHER PUBLICATIONS

Gregory W. Peterson, Christopher J. Karwacki, William B. Feaver and Joseph A. Rossin, "Zirconium Hydroxide as a Reactive Substrate for the Removal of Sulfur Dioxide," Ind. Eng. Chem. Res. (2009) 48, pp. 1694-1698. Published on Web Jan. 26, 2009.*
Sohn et al., "Characterization and Acid Catalytic Properties of NiO supported on ZrO2 and modified with MoO3," Solid State Phenomena vols. 124-126 (2007) pp. 1797-1800.*
Peterson et al., "Enhanced Cyanogen Chloride Removal by the Reactive Zirconium Hydroxide Substrate," Ind. Eng. Chem. Res. 2010, 49, 11182-11187. Published on Web Oct. 1, 2010.*

* cited by examiner

*Primary Examiner* — Anthony J Zimmer
(74) *Attorney, Agent, or Firm* — Ulysses John Biffoni

(57) ABSTRACT

The present invention relates to a novel filtration media and process for removing toxic materials from streams of air at ambient conditions using the novel filtration media. The filtration media is comprised of porous zirconium hydroxide onto which at least one reactive moiety is impregnated.

6 Claims, No Drawings

FILTRATION MEDIA AND PROCESS FOR THE REMOVAL OF HAZARDOUS MATERIALS FROM AIR STREAMS

GOVERNMENT INTEREST

The invention described herein may be manufactured, used and licensed by or for the U.S. Government.

FIELD OF INVENTION

The present invention relates to a novel filtration media and processes for removing toxic materials from streams of air at ambient conditions using the novel filtration media.

BACKGROUND OF THE INVENTION

Carbon-based filters are employed in individual and collective-protection applications to provide safe breathing to personnel in a chemically contaminated environment. General purpose filters, such as those employed by first responders and the military, for example, are designed to remove a wide range of toxic vapors. Examples of toxic vapors removed by general purpose filters include, for example, hydrogen cyanide, cyanogen chloride, phosgene, sulfur dioxide, hydrogen chloride and chlorine. The filter, in its simplest form, consists of a housing into which filtration media is located. The contaminated air stream is passed through the bed of filtration media. It is upon contacting the contaminated air stream with the filtration media that toxic vapors are removed by either physical adsorption or by chemical reaction.

Typically, general purpose respirator filters employ activated carbon impregnated with basic metal salts which include, for example, copper-chromium, copper-molybdenum (U.S. Pat. No. 4,801,311), and copper/zinc/molybdenum (U.S. Pat. No. 5,492,882). Examples of basic metal salts include carbonates, hydroxides and oxides. In several instances, triethylenediamine is added to the formulation to promote the removal of cyanogen chloride (U.S. Pat. No. 4,802,898).

Carbon-based filtration media rely on the metal impregnants to facilitate chemical reactions. This is because the contribution of the carbon substrate to the chemical reactions is small. For example, mixtures of copper carbonate/copper hydroxide may be impregnated into the pores of activated carbon to promote stoichiometric reactions involving the removal of acid gases, such as for example hydrochloric acid (HCl):

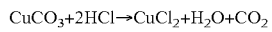

$$CuCO_3 + 2HCl \rightarrow CuCl_2 + H_2O + CO_2$$

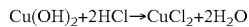

$$Cu(OH)_2 + 2HCl \rightarrow CuCl_2 + 2H_2O$$

From the above reactions, the basic copper salts react with hydrochloric acid to produce the corresponding copper (II) chloride while liberating $H_2O$ and, in the case of the carbonate, carbon dioxide ($CO_2$). Note that the above reactions are stoichiometric and not catalytic. That is to say, one copper carbonate or copper hydroxide molecule will remove two molecules of hydrochloric acid. As a result of the stoichiometric nature of the reaction, it is desired to maximize the number of reactive sites associated with the filtration media.

As is well known to one skilled in the art, a well dispersed metal phase is desired in order to maximize the number of sites available to facilitate the reactions necessary for the removal of toxic vapors. Often times, the loading of basic metal salts is limited to approximately 10% by weight metal to 15% by weight metal. Higher metal loadings can result in the formation of large metal particles, leading to pore blockage and a decreased overall effectiveness of the filtration media.

Procedures for impregnating activated carbon with basic impregnants are well known to one skilled in the art. These procedures involve mixing carbonates, hydroxides and/or ammonium complexes of base metals such as for example copper (copper carbonate-hydroxide), molybdenum (ammonium molybdate), zinc (zinc carbonate-hydroxide) and vanadium (ammonium vanadate), in concentrated ammonium hydroxide solutions. Optionally, ammonium carbonate is added. The solution is used to impregnate activated carbon granules to the desired metal loading. Materials prepared according to this procedure do not; however, disperse the metal phase throughout the pore structure. For example, it has been reported that activated carbon impregnated with copper and zinc, or copper, zinc and molybdenum, results in locating zinc primarily at the external surface of the granule, versus a zinc phase well dispersed throughout the pore structure (Rossin and Morrison, Carbon 29, (1991) 887; Rossin and Morrison, Carbon 31, (1993) 657). The net effect is a reduced dispersion of zinc and a poor utilization of the zinc phase.

One mechanism for increasing the effectiveness of a filtration media to facilitate stoichiometric reactions is to employ a functionalized porous media. In this manner, the support, along with the impregnants, will be capable of contributing to stoichiometric reactions leading to the removal of toxic vapors.

Substrates other than activated carbon are known to be useful in removing toxic chemicals. One example is zirconium hydroxide, (Peterson et al., Ind. Eng. Chem. Res. 48 (2009) 1694), wherein zirconium hydroxide was found to remove sulfur dioxide from streams of air in an order of magnitude greater than the value achieved for activated carbon.

The removal of cyanide compounds, such as for example hydrogen cyanide, is of special interest to this invention. Base metal carbonates, hydroxides and oxides of copper and zinc are known by one skilled in the art to be effective in the removal of hydrogen cyanide. For example, hydrogen cyanide is removed upon contact with, for example, copper carbonate according to the following reactions:

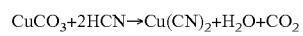

$$CuCO_3 + 2HCN \rightarrow Cu(CN)_2 + H_2O + CO_2$$

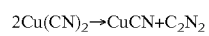

$$2Cu(CN)_2 \rightarrow CuCN + C_2N_2$$

According to the first reaction, copper carbonate reacts with hydrogen cyanide to form copper (II) cyanide. Copper cyanide subsequently decomposes to yield copper (I) cyanide, liberating cyanogen, which is highly toxic and therefore an undesired by-product. The addition of molybdenum to the formulation has been shown to minimize the formation of cyanogen; however, cyanogen formation is not eliminated all together. The role of molybdenum in minimizing cyanogen formation is not clear. One possible explanation is that molybdenum complexes with copper, increasing the stability of the copper (II) cyanide complex.

Zinc is much more preferred in applications involving the removal of cyanide compounds, such as for example hydrogen cyanide. Hydrogen cyanide is removed upon contact with zinc carbonate, for example, according to the following reaction:

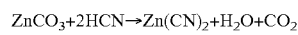

$$ZnCO_3 + 2HCN \rightarrow Zn(CN)_2 + H_2O + CO_2$$

There is no reduction of zinc (II) cyanide to zinc (I) cyanide, as per reactions involving copper as described above.

This is because zinc does not possess a stable +1 oxidation state, and, as a result, the product zinc (II) cyanide is stable.

There are issues associated with the use of zinc only in carbon-based filtration media. In order for an impregnant to be effective, the impregnant must be well dispersed throughout the pore structure of the media. As stated above, impregnation of carbon-based media with zinc results in the zinc being confined to a region at or very near the external surface of the granule, leading to a poor metal dispersion and consequently a poor utilization of zinc.

The removal of cyanogen chloride is also of special interest to the present invention. Triethylenediamine (TEDA) is known by one skilled in the art to be effective in the removal of cyanogen chloride. Although not wishing to be bound by theory, it is believed that TEDA catalyzes the hydrolysis of cyanogen chloride as described below:

$$ClCN + H_2O \xrightarrow{TEDA} HCl + HCNO$$

Reaction product hydrochloric acid, HCl, is then removed via reaction with base metal carbonates, hydroxides and/or oxides, or via reaction with TEDA. Reactions involving HCl and TEDA will poison TEDA. As known by one skilled in the art, the addition of base metal oxides, hydroxides and/or oxides to TEDA impregnated activated carbon will increase the service time of the filter.

Thus an objective of the present invention is to provide an improved filtration media for removing hazardous materials from air streams. Another objective is to incorporate at least one reactive moiety within the filtration media, to enhance the filtration performance. A further objective is to provide a method of using the improved filtration media to remove hazardous materials from air streams.

SUMMARY OF THE INVENTION

The present invention relates to a novel filtration media and process for removing toxic materials from streams of air at ambient conditions using the novel filtration media. The filtration media is comprised of porous zirconium hydroxide onto which at least one reactive moiety is impregnated. The reactive moiety is selected from materials which react with the toxic materials and/or catalyze reaction of the toxic materials with other moieties.

DETAILED DESCRIPTION OF THE INVENTION

The present invention relates to a novel filtration media and process for removing toxic materials from streams of air at ambient conditions. The novel filtration media is comprised of porous zirconium hydroxide, $Zr(OH)_4$, impregnated with at least one reactive and/or catalytic moiety.

Substrate

Zirconium hydroxide ($Zr(OH)_4$) is employed as a reactive substrate in the present invention. Although we refer to the substrate as zirconium hydroxide, the product may be in the form of a polymorph of zirconium hydroxide, zirconium oxyhydroxide and zirconium oxide. As sold on the commercial market, zirconium hydroxide is an amorphous, white powder that is insoluble in water. Zirconium hydroxide may be prepared by precipitating zirconium salts, such as for example zirconium oxynitrate and zirconium oxychloride, in aqueous solutions using alkaline solutions to bring about precipitation. Examples of alkaline solutions include ammonium hydroxide, potassium hydroxide and sodium hydroxide. Alternatively, zirconium hydroxide may be purchased as a commercial product from vendors that include Magnesium Electron (Flemington, N.J., USA). The structure of zirconium hydroxide, $Zr(OH)_4$, may be represented as a two-dimensional square lattice, each connected by a double hydroxyl bridge yielding a stoichiometric $Zr(OH)_4$. $Zr(OH)_4$ particles contain both terminal and bridging hydroxyl groups (Southern et al., Chem. Mater. 14 (2002) 4313).

Table 1 below compares the density and porosity of zirconium hydroxide granules to activated carbon granules representative of those employed by the prior art in the preparation of filtration media. The carbon granules were obtained from Calgon Carbon Corporation as product CWS carbon. The $Zr(OH)_4$ was purchased from Magnesium Electron, Inc. (New Jersey, USA). In Table 1, the surface area is expressed in units of $m^2$ per $cm^3$ of filter volume ($m^2/cm^3$) and the pore volume is expressed in units of $cm^3$ pore volume per $cm^3$ filter volume rather than the standard units of $m^2/g$ and $cm^3/g$, respectively. The former units are employed to account for the difference in the density of the two materials. $Zr(OH)_4$, because of the higher molecular weight of zirconium relative to carbon, has a much higher density. Filters are filled by volume, not weight. Although not wishing to be bound by theory, we believe the surface area and pore volume contained in the filter volume is far more important than the specific surface area (expressed in units of $m^2/g$) and specific pore volume (expressed in units of $cm^3/g$).

TABLE 1

| Material | Density | Surface Area | Pore Volume |
|---|---|---|---|
| Activated Carbon | $0.47\ cm^3/g$ | $520\ m^2/cm^3$ | $0.31\ cm^3/cm^3$ |
| $Zr(OH)_4$ | $0.93\ cm^3/g$ | $415\ m^2/cm^3$ | $0.35\ cm^3/cm^3$ |

$Zr(OH)_4$ has sufficient capacity in its own right for the removal of many toxic vapors. However, such basis media will not possess sufficient capacity for the removal of many toxic vapors, such as for example hydrogen cyanide, and will thus require the addition of base metals, or mixtures thereof, to facilitate said removal.

Reactive Moieties/Functional Groups

At least one reactive and/or catalytic moiety/functional group is/are incorporated onto the substrate. Suitable reactive moieties are selected from base metals. The suitable base metals include vanadium, chromium, manganese, iron, cobalt, nickel, copper, zinc, silver molybdenum, and mixtures thereof. Copper, zinc, and silver are preferred. Zinc is even more preferred, since zinc will not form the hazardous product cyanogen upon exposure to hydrogen cyanide. The base metal may be in several forms, such as for example, free metal, carbonates, oxides and hydroxides. Carbonates and hydroxides are the preferred form. The base metal is present in the amount of about 5% to about 40% by weight of the filtration media. An amount of about 15% to about 25% is also useful.

Other reactive moieties can be incorporated into the zirconium hydroxide substrate. Of particular interest are amines which are useful in applications involving toxic chemicals that may be removed via hydrolysis reactions, such as, for example, those reactions described for cyanogen chloride as described previously.

The suitable amines are triethylamine (TEA), quinuclidine (QUIN), triethylenediamine (TEDA), pyridine, and pyridine carboxylic acids such as pyridine-4-carboxylic acid (P4CA). Triethylenediamine is most preferred. The loading of TEDA can be as low as 0%, if hydrolysis activity is not desired in the application, or up to about 15% by weight of the filtration media, should hydrolysis activity be desired. A preferred amount of TEDA used is from about 3% to about 6% by weight of the filtration media.

The present invention optionally includes at least one alkaline metal or alkaline earth metal to enhance filtration performance. Such metals are selected from lithium, sodium, potassium, rubidium, cesium, beryllium, magnesium, calcium and barium. The alkali or alkaline earth metal may be present as an oxide, hydroxide or carbonate, or mixture thereof. Up to 5% of alkali or alkaline earth metal can be used. An amount of about 0.5% to about 3% by weight of the filtration media is also useful.

Method for Preparing the Novel Filtration Media

Porous zirconium hydroxide impregnated with reactive moieties may be prepared using techniques well known to one skilled in the art. However, it should be noted that the method of preparation can have a significant impact on the performance of the resulting material. One method of preparation is to form zirconium hydroxide powder into particles, beads, extrudates, etc. of the desired mesh size. The powder (in agglomerated or non-agglomerated form) is then impregnated using ammonium solutions containing the target concentration of base metal(s) and, if desired, alkali metals. Following impregnation, the material is then dried at temperatures not to exceed about for example 200° C., and preferably not to exceed about for example 100° C., as this will bring about the dehydration of the zirconium hydroxide, reducing its porosity and also its filtration effectiveness.

Following drying, the impregnated material, if desired, can then be forwarded for amine (such as for example TEDA) impregnation. Using TEDA as an example, amine impregnation may be performed using techniques known to one skilled in the art. Preferably, TEDA is impregnated via a sublimation operation. For example, a known mass of impregnated formed powder plus the desired amount of TEDA are loaded into a V-blender or rotating drum, for example, for the purpose of contacting the formed powder with TEDA. During the operation, TEDA will sublime into the pores of the formed powder over time. Heating the apparatus to temperatures on the order of about 50° C. to 100° C., for example, will speed the sublimation operation.

A more preferred method of preparation involves impregnation of the porous $Zr(OH)_4$ in the form of a powder. This is accomplished using impregnation techniques as described above. For example, the $Zr(OH)_4$ powder is preferably dried at for example 100° C. to remove pre-adsorbed moisture. An impregnation solution is prepared by dissolving a base metal salt, e.g. carbonate in a concentrated ammonium solution. The powder is then contacted with the solution until incipient wetness is achieved. At this point, the powder is dried in an oven at for example 100° C. Once dry, the powder can be impregnated with TEDA by placing the desired amount of powder and the desired amount of TEDA in a device designed to contact the two materials, such as for example a V-blender or rotating drum. The TEDA and impregnated powder are blended for a time sufficient to allow the TEDA to sublime into the pores. The TEDA containing impregnated powder is then formed into the desired geometric form, e.g. particles, beads, extrudates, etc., of the desired size using techniques known to those skilled in the art. One method is to form the powder into pills or tablets using a tableting machine. Alternatively, the powder can be pressed into large tablets, which are then crushed and sieved into particles of the desired mesh size.

An even more preferred method of preparation involves precipitation of the metals onto the porous $Zr(OH)_4$ substrate. For example, $Zr(OH)_4$ powder is slurried in water. To the slurry is added a predetermined amount of alkali metal hydroxide, such as for example, sodium hydroxide, potassium hydroxide or lithium hydroxide. A second solution is prepared containing a base metal salt dissolved in DI water, for example zinc sulfate, zinc nitrate, zinc chloride, zinc acetate, copper sulfate, copper nitrate, copper chloride, silver nitrate, silver chloride, silver acetate, silver sulfate etc. Mixtures of salts may also be employed. The solution is then added to the slurry. The pH of the slurry is then adjusted to the target value, of between about 5 and about 13, preferably between about 7 and about 11, more preferably between about 9 and about 10. The pH adjuster is an appropriate acid, such as for example sulfuric acid, nitric acid, hydrochloric acid or formic acid. The reduction in pH will result in the base metal being precipitated onto the surface of the zirconium hydroxide substrate, likely in the form of a metal hydroxide, such as zinc hydroxide, copper hydroxide, etc. Upon completion of the precipitation, the slurry is filtered, then washed with DI water to remove any residual acid. The resulting solids are dried. The resulting dried powder may then be impregnated with TEDA as described previously. Upon completion of the TEDA impregnation operation, the resulting powder may be formed into particles as described previously using techniques known to one skilled in the art.

An advantage of the above mentioned precipitation procedure is that the use of ammonia can be readily avoided. This is important, as filtration media employed in general purpose respirators have issues related to ammonia off-gassing as a result of impregnating the media using concentrated ammonia solutions.

The nature and loading of reactive moieties will depend upon the application. For applications that involve cyanide gases, for example hydrogen cyanide, zinc is the preferred reactive moieties since undesired by-product cyanogen will not form.

Process for Filtration of Toxic Chemicals Using Novel Filtration Media

The novel process disclosed herein involves contacting a bed of filtration media as described herein with an air stream containing toxic vapors or aerosol particles contained within the air stream. Non-limiting examples of toxic vapors include acid gases, blood agents, or blistering agents selected from hydrogen cyanide, cyanogen chloride, phosgene, hydrochloric acid, fuming nitric acid, nitrogen dioxide, sulfur dioxide, hydrogen fluoride, hydrogen bromide, carbonyl fluoride, fluorine and sarin. Aerosol chemical warfare agents as well as industrial toxins can also be filtered from the air stream. Non-limiting examples further include AChE-inhibiting pesticides such as parathion, paraoxon and malathion, organophosphorus-based ("OP") compounds, and nerve or vesicant agents selected from sarin (GB), bis-(2-chloroethyl)sulfide (HD or mustard gas), pinacolyl methylphosphonothiolate (GD) and 0-ethyl S-(2-diisopropylamino)ethyl methylphosphonothiolate (VX), as well as analogs and derivatives of these agents. Industrial toxins may include parathion. Aerosol chemicals will either evaporate into the vapor phase upstream of the filter bed, or accumulate as droplets on the filter material, only to be absorbed within the pores of the solid at a later time. Alternatively, the aerosol chemicals may be entrapped on a particle filter (located upstream of the filter media), whereby the entrained chemical will evaporate over time and adsorb within the pores of the filtration media. The concentration of toxic materials in the contaminated air stream can be greater than 1% by volume. The filter may be any device that brings into contact the contaminated air stream with the filter material. Such as for example, the filter can be a standard respirator filter worn on a face mask or one employed in collective protection applications such as involving vehicles and buildings. It is desired that the filter be of sufficient volume to provide a contact time between the air stream and the filter media of at least 0.05 seconds, and preferably of at least 0.15 seconds.

The novel process disclosed herein is designed to operate under ambient conditions, which can vary significantly based on the location and environmental conditions. Generally, the novel process described herein is designed to operate as low as for example –20° C. and as high as for example 49° C. The humidity of the process stream may be as low as for example less than 5% relative humidity to as high as for example greater than 90% relative humidity.

EXAMPLES

Breakthrough testing was performed for the purpose of determining the ability of the novel filtration material described herein to remove toxic vapors from streams of air. Methods for performing breakthrough testing are well known to one skilled in the art. Briefly, a known volume of filtration media is loaded into a tube and supported on an entrainment device such as a fine mesh screen. The filtration media is contacted with the contaminated air at the target humidity (water content), flow rate and temperature. The effluent stream is monitored continuously or at discrete intervals for the concentration of toxic chemical or hazardous by-product. The breakthrough time is defined as the time in which the effluent concentration of toxic chemical exceeds a threshold value (referred to as breakthrough concentration). Analytical devices used to determine the concentration of toxic chemical in the feed or effluent streams include, but are not limited to, infra red spectrometers, gas chromatographs, and UV visible detectors.

Example 1

Baseline $Zr(OH)_4$

Zirconium hydroxide powder was purchased from a commercial vendor. The powder was pressed into wafers approximately 2.5 cm in diameter and 1 to 2 mm thick using a steel die and a hydraulic press. The resulting wafers were crushed and sieved to yield 12×30 mesh particles. The particles were forwarded for breakthrough testing.

$SO_2$ breakthrough testing was performed by adding 15.1 $cm^3$ of 12×30 mesh $Zr(OH)_4$ particles to a 3.1 cm i.d. test cell. The volume of 12×30 mesh $Zr(OH)_4$ particles was sufficient to achieve a bed depth of 2.0 cm. The media in the test cell was challenged with 2,000 $mg/m^3$ of $SO_2$ in air at 15% relative humidity (RH) with a total flow rate of 4,350 ml/min. The flow rate yields a linear velocity through the bed of 9.6 cm/s. The $SO_2$ breakthrough concentration was 13 $mg/m^3$.

The above $SO_2$ breakthrough test was repeated using 12×30 mesh $Zr(OH)_4$ that was pre-humidified at 25° C., 80% RH overnight in an environmental chamber. The humidified media was loaded into the test cell to achieve bed depth of 2.0 cm. The test was performed as describe above employing a linear velocity of 9.6 cm/s and an RH of 80%. The $SO_2$ breakthrough concentration was 13 $mg/m^3$. $SO_2$ filtration performance data are summarized below. RH does not significantly impact $SO_2$ filtration.

| [$SO_2$] | Linear Velocity | Bed Depth | RH | Breakthrough Time |
|---|---|---|---|---|
| 2,000 $mg/m^3$ | 9.6 cm/s | 2.0 cm | 15% | 91 minutes |
| 2,000 $mg/m^3$ | 9.6 cm/s | 2.0 cm | 80% | 88 minutes |

$NO_2$ breakthrough testing was performed by adding 15.1 $cm^3$ of 12×30 mesh $Zr(OH)_4$ particles to a 3.1 cm i.d. test cell. The volume of 12×30 mesh $Zr(OH)_4$ particles was sufficient to achieve a bed depth of 2.0 cm. The media in the test cell was challenged with 1,000 $mg/m^3$ of $NO_2$ in air at 15% relative humidity (RH) at a linear velocity of 9.6 cm/s. The $NO_2$ breakthrough concentration was 5 $mg/m^3$, the NO breakthrough concentration was 30 $mg/m^3$. $NO_2$ filtration performance data are summarized below. Breakthrough occurred as NO.

| [$NO_2$] | Linear Velocity | Bed Depth | RH | Breakthrough Time |
|---|---|---|---|---|
| 1,000 $mg/m^3$ | 9.6 cm/s | 2.0 cm | 15% | 9 minutes |

The above $NO_2$ breakthrough test was repeated using 12×30 mesh $Zr(OH)_4$ that was pre-humidified at 25° C., 80% RH overnight in an environmental chamber. The humidified media was loaded into the test cell to achieve bed depth of 2.0 cm. The test was performed as described above employing a linear velocity of 9.6 cm/s and an RH of 80%. $NO_2$ breakthrough occurred immediately, with the effluent concentration of $NO_2$ rapidly increasing to approximately 75 $mg/m^3$. However, the effluent $NO_2$ concentration remained below 100 $mg/m^3$ for approximately 1 hour, demonstrating $NO_2$ removal capacity of the media.

Fuming nitric acid, $HNO_3$, breakthrough testing was performed by adding 15.1 $cm^3$ of 12×30 mesh $Zr(OH)_4$ particles to a 3.1 cm i.d. test cell. The volume of 12×30 mesh $Zr(OH)_4$ particles was sufficient to achieve a bed depth of 2.0 cm. The media in the test cell was challenged with 2,000 $mg/m^3$ of $HNO_3$ in dry air at a linear velocity of 9.6 cm/s. The $HNO_3$ breakthrough concentration was 5 $mg/m^3$, the $NO_2$ breakthrough concentration was 5 $mg/m^3$, and the NO breakthrough concentration was 30 $mg/m^3$. $HNO_3$ breakthrough data are summarized below. Breakthrough occurred as $HNO_3$.

| [$HNO_3$] | Linear Velocity | Bed Depth | RH | Breakthrough Time |
|---|---|---|---|---|
| 2,000 $mg/m^3$ | 9.6 cm/s | 2.0 cm | Dry | 50 minutes |

Phosgene, $COCl_2$, breakthrough testing was performed by adding 26.4 $cm^3$ of 12×30 mesh $Zr(OH)_4$ particles to a 4.1 cm i.d. test cell. The volume of 12×30 mesh $Zr(OH)_4$ particles was sufficient to achieve a bed depth of 2.0 cm. The media in the test cell was challenged with 10,000 $mg/m^3$ of $COCl_2$ in 50% RH air at a linear velocity of 6.0 cm/s. The $COCl_2$ breakthrough concentration was 5 $mg/m^3$. Phosgene breakthrough data are summarized below:

| [$COCl_2$] | Linear Velocity | Bed Depth | RH | Breakthrough Time |
|---|---|---|---|---|
| 10,000 $mg/m^3$ | 6.0 cm/s | 2.0 cm | 50% | 25 minutes |

Cyanogen chloride, ClCN, breakthrough testing was performed by pre-humidifying 26.4 $cm^3$ of 12×30 mesh $Zr(OH)_4$ particles overnight in an environmental chamber at 25° C., 80% RH. The pre-humidified media was added to a 4.1 cm i.d.

test cell. The volume of 12×30 mesh $Zr(OH)_4$ particles was sufficient to achieve a bed depth of 2.0 cm. The media in the test cell was challenged with 4,000 mg/m³ of ClCN in 80% RH air at a linear velocity of 6.0 cm/s. The ClCN breakthrough concentration was 5 mg/m³. Breakthrough occurred instantaneously, with the feed concentration of ClCN achieved in less than 3 minutes.

Hydrogen cyanide, HCN, breakthrough testing was performed by adding 26.4 cm³ of 12×30 mesh $Zr(OH)_4$ particles to a 4.1 cm i.d. test cell. The volume of 12×30 mesh $Zr(OH)_4$ particles was sufficient to achieve a bed depth of 2.0 cm. The media in the test cell was challenged with 4,000 mg/m³ of ClCN in 80% RH air at a linear velocity of 6.0 cm/s. The HCN breakthrough concentration was 5 mg/m³. The cyanogen, $(CN)_2$, breakthrough concentration was also 5 mg/m³. Breakthrough occurred instantaneously as HCN, with the feed concentration of HCN achieved in less than 3 minutes.

Example 2

TEDA Impregnated $Zr(OH)_4$

Zirconium hydroxide powder was purchased from a commercial vendor. The powder was dried for a minimum of 3 hours at 80° C. prior to triethylene diamine (TEDA) impregnation. To a V-blender was added dried $Zr(OH)_4$ powder plus the desired amount of TEDA. The V-blender was sealed, then rotated in a temperature-controlled enclosure at 60° C. for a minimum of two hours. The temperature is sufficient to sublime the TEDA, with the vapor phase TEDA adsorbing in the pores of the $Zr(OH)_4$ powder. Following blending, the powder was removed from the V-blender, then pressed into wafers as described in Example 1. The resulting wafers were crushed and sieved to yield 12×30 mesh particles. The particles were forwarded for breakthrough testing.

Samples prepared with between 0 and 10% TEDA were subjected to cyanogen chloride breakthrough testing using the procedure described previously. Results are summarized below:

| TEDA Loading | [ClCN] | Linear Velocity | Bed Depth | RH | Breakthrough Time |
|---|---|---|---|---|---|
| 0 | 4,000 mg/m³ | 6.0 cm/s | 2.0 cm | 80% | 0 minutes |
| 1% | 4,000 mg/m³ | 6.0 cm/s | 2.0 cm | 80% | 1 minutes |
| 3% | 4,000 mg/m³ | 6.0 cm/s | 2.0 cm | 80% | 41 minutes |
| 6% | 4,000 mg/m³ | 6.0 cm/s | 2.0 cm | 80% | 90 minutes |
| 10% | 4,000 mg/m³ | 6.0 cm/s | 2.0 cm | 80% | 67 minutes |

Although breakthrough occurred near-instantaneously for the sample impregnated with 1% TEDA, the material displayed removal capacity. Results demonstrate that TEDA is required to facilitate the removal of cyanogen chloride. While not wishing to be bound by any particular theory, it is believed that TEDA promotes the hydrolysis of cyanogen chloride to yield HCNO plus HCl.

Cyanogen chloride data were also recorded employing a linear velocity of 9.6 cm/s. These data are presented below:

| TEDA Loading | [ClCN] | Linear Velocity | Bed Depth | RH | Breakthrough Time |
|---|---|---|---|---|---|
| 0 | 4,000 mg/m³ | 9.6 cm/s | 2.0 cm | 80% | 0 minutes |
| 3% | 4,000 mg/m³ | 9.6 cm/s | 2.0 cm | 80% | 0.2 minutes |
| 6% | 4,000 mg/m³ | 9.6 cm/s | 2.0 cm | 80% | 3.8 minutes |

Although the breakthrough time decreased sharply upon increasing the linear velocity from 6.0 cm/s to 9.6 cm/s, breakthrough at 9.6 cm/s occurred slowly. For example, following one hour of cyanogen chloride exposure, the effluent concentration of cyanogen chloride was less than 10% that of the feed.

Sulfur dioxide, $SO_2$, breakthrough testing was performed as previously described. Data are summarized below:

| TEDA Loading | [$SO_2$] | Linear Velocity | Bed Depth | RH | Breakthrough Time |
|---|---|---|---|---|---|
| 0 | 2,000 mg/m³ | 9.6 cm/s | 2.0 cm | 15% | 91 minutes |
| 6% | 2,000 mg/m³ | 9.6 cm/s | 2.0 cm | 80% | 68 minutes |

$NO_2$ breakthrough testing was performed as described previously. Breakthrough occurred as NO. Data are summarized below.

| TEDA Loading | [$NO_2$] | Linear Velocity | Bed Depth | RH | Breakthrough Time |
|---|---|---|---|---|---|
| 0% | 1,000 mg/m³ | 9.6 cm/s | 2.0 cm | 15% | 9 minutes |
| 3% | 1,000 mg/m³ | 9.6 cm/s | 2.0 cm | 15% | 20 minutes |
| 6% | 1,000 mg/m³ | 9.6 cm/s | 2.0 cm | 80% | 45 minutes |

The addition of TEDA to the material enhances the $NO_2$ breakthrough time.

Phosgene, $COCl_2$, breakthrough testing was performed by adding 26.4 cm³ of 12×30 mesh $Zr(OH)_4$ particles to a 4.1 cm i.d. test cell. The volume of 12×30 mesh $Zr(OH)_4$ particles was sufficient to achieve a bed depth of 2.0 cm. The media in the test cell was challenged with 10,000 mg/m³ of $COCl_2$ in 50% RH air at a linear velocity of 6.0 cm/s. The $COCl_2$ breakthrough concentration was 5 mg/m³. Phosgene breakthrough data are summarized below:

| TEDA Loading | [$COCl_2$] | Linear Velocity | Bed Depth | RH | Breakthrough Time |
|---|---|---|---|---|---|
| 0% | 10,000 mg/m³ | 6.0 cm/s | 2.0 cm | 50% | 25 minutes |
| 6% | 10,000 mg/m³ | 6.0 cm/s | 2.0 cm | 50% | 50 minutes |

The addition of TEDA to the material enhances the phosgene breakthrough time. While not wishing to be bound by any particular theory, it is believed that TEDA promotes the hydrolysis of phosgene to hydrochloric acid, HCl, thereby enhancing the breakthrough time.

Chlorine, $Cl_2$, breakthrough testing was performed by adding 26.4 cm³ of 12×30 mesh $Zr(OH)_4$ particles to a 4.1 cm i.d. test cell. The volume of 12×30 mesh $Zr(OH)_4$ particles was sufficient to achieve a bed depth of 2.0 cm. The media in the test cell was challenged with 4,000 mg/m³ of $Cl_2$ in 15% RH air at a linear velocity of 9.6 cm/s. The $Cl_2$ breakthrough concentration was 1.5 mg/m³. Chlorine breakthrough data are summarized below:

| TEDA Loading | [$Cl_2$] | Linear Velocity | Bed Depth | RH | Breakthrough Time |
|---|---|---|---|---|---|
| 6% | 4,000 mg/m³ | 9.6 cm/s | 2.0 cm | 15% | 34.7 minutes |

6% TEDA containing $Zr(OH)_4$ was evaluated for its ability to remove hydrogen cyanide as described previously. Hydrogen cyanide breakthrough was instantaneous, with the feed concentration being achieved within three minutes of challenge.

Example 3

Copper-TEDA Containing $Zr(OH)_4$

A 7% CuO-basis impregnated $Zr(OH)_4$ sample was prepared as follows. Note that while the sample is referred to as 7% CuO, the copper speciation has not been determined. Rather, all calculations are performed on the basis of copper oxide. 72.9 g of copper carbonate hydroxide was added to 250 ml of $NH_4OH$ solution. To the solution was added 20 g of $NH_4CO_3$ plus 150 ml DI water. The solution was mixed at room temperature until dissolved. The solution was used to impregnate 750 g of 12×30 mesh $Zr(OH)_4$ particles prepared as described in Example 1 to incipient wetness. The impregnated particles were dried at 80° C. overnight. Approximately 125 g of sample was impregnated to 3% TEDA by adding the copper carbonate impregnated $Zr(OH)_4$ to a V-blender along with 3.75 g of TEDA. The V-blender was rotated at 60° C. for 2 hours. The procedure was repeated using 125 g of copper carbonate impregnated $Zr(OH)_4$ and 7.5 g of TEDA to yield a material containing 6% TEDA. These materials are referred to as 7% Cu/Zr$(OH)_4$, 7% Cu/Zr$(OH)_4$-3T, and 7% Cu/Zr$(OH)_4$-6T. XPS analysis of the sample indicated that copper was primarily in the +1 oxidation state.

The above materials were evaluated for their ability to remove cyanogen chloride as described previously. These results are presented below:

| TEDA Loading | [ClCN] | Linear Velocity | Bed Depth | RH | Breakthrough Time |
|---|---|---|---|---|---|
| 0 | 4,000 mg/m³ | 9.6 cm/s | 2.0 cm | 80% | 0 minutes |
| 3% | 4,000 mg/m³ | 9.6 cm/s | 2.0 cm | 80% | 1.9 minutes |
| 6% | 4,000 mg/m³ | 9.6 cm/s | 2.0 cm | 80% | 6.1 minutes |

The above materials were evaluated for their ability to remove hydrogen cyanide as described previously. These results are presented below. Cyanogen was detected in the effluent stream, and the breakthrough time is also provided.

| TEDA Loading | [HCN] | Linear Velocity | Bed Depth | RH | Time HCN | Time $C_2N_2$ |
|---|---|---|---|---|---|---|
| 0 | 4,000 mg/m³ | 9.6 cm/s | 2.0 cm | 50% | 32.2 min | 21.5 min |
| 3% | 4,000 mg/m³ | 9.6 cm/s | 2.0 cm | 50% | 27.2 min | 19.3 min |
| 6% | 4,000 mg/m³ | 9.6 cm/s | 2.0 cm | 50% | 25.8 min | 16.7 min |

The above materials were evaluated for their ability to remove sulfur dioxide as described previously. These results are presented below:

| TEDA Loading | [SO₂] | Linear Velocity | Bed Depth | RH | Breakthrough Time |
|---|---|---|---|---|---|
| 0 | 2,000 mg/m³ | 9.6 cm/s | 2.0 cm | 80% | 112 minutes |
| 3% | 2,000 mg/m³ | 9.6 cm/s | 2.0 cm | 80% | 100 minutes |
| 6% | 2,000 mg/m³ | 9.6 cm/s | 2.0 cm | 80% | 116 minutes |

Example 4

Copper-TEDA Containing $Zr(OH)_4$

A 14% CuO-basis impregnated $Zr(OH)_4$ sample was prepared as follows. 14.6 g of copper carbonate hydroxide was added to 100 ml of $NH_4OH$ solution. To the solution was added 20 g of $NH_4CO_3$ plus 50 ml DI water. The solution was mixed at room temperature until dissolved. The solution was used to impregnate 150 g of $Zr(OH)_4$ powder to incipient wetness. The impregnated powder was dried at 80° C. The impregnation procedure was repeated a second time, with the final product dried at 80° C. overnight. 150 g of the resulting powder was added to a v-blender along with 9.0 g of TEDA. The contents were sealed, and the V-blender was rotated at 60° C. for 2 hours. The resulting powder was prepared as 12×30 mesh granules using procedures described in Example 1. XPS analysis of the sample revealed a significant portion of the copper was in the +2 oxidation state.

The above materials were evaluated for their ability to remove cyanogen chloride as described previously. These results are presented below:

| TEDA Loading | [ClCN] | Linear Velocity | Bed Depth | RH | Breakthrough Time |
|---|---|---|---|---|---|
| 6% | 4,000 mg/m³ | 9.6 cm/s | 2.0 cm | 80% | 33.9 minutes |

The above materials were evaluated for their ability to remove hydrogen cyanide as described previously. These results are presented below. Cyanogen was detected in the effluent stream, and the breakthrough time is also provided. Note that increasing the copper loading increases the hydrogen cyanide breakthrough time but decreases the cyanogen breakthrough time.

| TEDA Loading | [HCN] | Linear Velocity | Bed Depth | RH | Time HCN | Time $C_2N_2$ |
|---|---|---|---|---|---|---|
| 6% | 4,000 mg/m³ | 9.6 cm/s | 2.0 cm | 50% | 44.2 min | 6.4 min |

The above materials were evaluated for their ability to remove sulfur dioxide as described previously. These results are presented below:

| TEDA Loading | [SO₂] | Linear Velocity | Bed Depth | RH | Breakthrough Time |
|---|---|---|---|---|---|
| 6% | 2,000 mg/m³ | 9.6 cm/s | 1.5 cm | 80% | 77 minutes |

Example 5

Copper-TEDA Containing $Zr(OH)_4$

A 14% CuO-basis $Zr(OH)_4$ sample was prepared via precipitation as follows. 200 grams (dry basis) zirconium hydroxide powder was slurried with 1 liter DI water in a 1 gallon pail using a high shear mixer. To the slurry was added 70 g of potassium hydroxide (KOH) and 35 g tetrapropylammonium bromide (TPABr). TPABr is added as a surfactant to assist in dispersion of the precipitated copper. A second solution was prepared by dissolving 88.05 g of copper sulfate (31.8% by weight CuO) in 500 ml DI water. To the resulting solution was added 20 g of sulfuric acid. The two solutions were combined and the resulting pH of the slurry was 10.1. The pH of the slurry was maintained at 10.0 by periodic adjustments using sulfuric acid. Following approximately 3.5 hours, the mixing was terminated and the slurry was allowed to stand overnight. In the morning, the slurry was re-mixed, then filtered. The product was washed three times with DI water at 60° C. The final product was dried at 80° C. overnight. 200 g of the resulting powder was added to a V-blender along with 12.0 g of TEDA. The contents were sealed, and the V-blender was rotated at 60° C. for 2 hours. The resulting powder was prepared as 12×30 mesh granules using procedures described in Example 1. XPS analysis of the sample revealed a significant portion of the copper was in the +2 oxidation state. The presence of copper (II) coupled with the blue-green color of the produce indicates that the majority of the copper associated with the sample was copper (II) hydroxide ($Cu(OH)_2$).

The above materials were evaluated for their ability to remove cyanogen chloride as described previously, with the exception that a 1.5 cm deep bed, rather than a 2.0 cm deep bed, was employed. These results are presented below:

| TEDA Loading | [ClCN] | Linear Velocity | Bed Depth | RH | Breakthrough Time |
|---|---|---|---|---|---|
| 6% | 4,000 mg/m$^3$ | 9.6 cm/s | 1.5 cm | 80% | 14.3 minutes |

The above material was evaluated for its ability to remove hydrogen cyanide as described previously. These results are presented below. Cyanogen was detected in the effluent stream, and the breakthrough time is also provided. Note that precipitation of copper onto the zirconium hydroxide did not prevent the formation and premature breakthrough of cyanogen.

| TEDA Loading | [HCN] | Linear Velocity | Bed Depth | RH | Time HCN | Time $C_2N_2$ |
|---|---|---|---|---|---|---|
| 6% | 4,000 mg/m$^3$ | 9.6 cm/s | 1.5 cm | 50% | 29.3 min | 2.0 min |

The above materials were evaluated for their ability to remove sulfur dioxide as described previously. These results are presented below:

| TEDA Loading | [$SO_2$] | Linear Velocity | Bed Depth | RH | Breakthrough Time |
|---|---|---|---|---|---|
| 6% | 2,000 mg/m$^3$ | 9.6 cm/s | 1.5 cm | 80% | 60 minutes |

Example 6

Zinc-TEDA Impregnated $Zr(OH)_4$

Zirconium hydroxide was impregnated to 20% ZnO-basis as follows. 46.2 g of zinc carbonate hydroxide (75.3 wt % ZnO) was dissolved in 450 ml of warm, concentrated $NH_4OH$ solution. The solution was used to impregnate 348 g of dried $Zr(OH)_4$ powder to incipient wetness. The resulting powder was dried at 80° C. Once dry, the impregnation was repeated a second time, with the produce also dried at 80° C. overnight. The 215 g of the resulting powder was impregnated to 6% TEDA by placing the powder and 12.9 g of TEDA into a V-blender. The V-blender was loaded into a forced convection oven at 60° C. and rotated. Following 2 hours, the V-blender was removed from the oven and its contents were removed. The resulting powder was prepared as 12×30 mesh granules as described in Example 1.

The above material was evaluated for its ability to remove cyanogen chloride as described previously, with the exception that a 1.5 cm deep bed, rather than a 2.0 cm deep bed, was employed. These results are presented below:

| TEDA Loading | [ClCN] | Linear Velocity | Bed Depth | RH | Breakthrough Time |
|---|---|---|---|---|---|
| 6% | 4,000 mg/m$^3$ | 9.6 cm/s | 1.5 cm | 80% | 16.4 minutes |

The above material was evaluated for its ability to remove hydrogen cyanide as described previously. These results are presented below. Cyanogen was not detected in the effluent stream. The lack of cyanogen formation is attributed to the stability of zinc(II) cyanide.

| TEDA Loading | [HCN] | Linear Velocity | Bed Depth | RH | Time HCN | Time $C_2N_2$ |
|---|---|---|---|---|---|---|
| 6% | 4,000 mg/m$^3$ | 9.6 cm/s | 2.0 cm | 50% | 41.0 min | Not detected |

The above materials were evaluated for their ability to remove sulfur dioxide as described previously. These results are presented below:

| TEDA Loading | [$SO_2$] | Linear Velocity | Bed Depth | RH | Breakthrough Time |
|---|---|---|---|---|---|
| 6% | 2,000 mg/m$^3$ | 9.6 cm/s | 1.5 cm | 80% | 56 minutes |

The above material was evaluated for its ability to remove sarin, a highly toxic chemical warfare agent. These results are presented below.

| TEDA Loading | [Sarin] | Linear Velocity | Bed Depth | RH | Breakthrough Time |
|---|---|---|---|---|---|
| 6% | 1,000 mg/m$^3$ | 9.6 cm/s | 1.6 cm | 15% | 157 minutes |
| 6% | 1,000 mg/m$^3$ | 9.6 cm/s | 2.0 cm | 15% | 282 minutes |

The above material was evaluated for its ability to remove $NO_2$. Breakthrough occurred as NO, rather than $NO_2$. Results are presented below.

| TEDA Loading | [$NO_2$] | Linear Velocity | Bed Depth | RH | Breakthrough Time (as NO) |
|---|---|---|---|---|---|
| 6% | 1,000 mg/m$^3$ | 9.6 cm/s | 2.0 cm | 15% | 12 minutes |

Example 7

Zinc-TEDA Impregnated $Zr(OH)_4$

A 20% $ZnO/Zr(OH)_4$ powder containing 6% TEDA was prepared via precipitation as follows. 200 g of dried zirconium hydroxide powder was slurried in 1.0 liters of DI water using a high shear mixer. To the slurry was added 120 g of potassium hydroxide (KOH) and 35 g of tetrapropylammonium bromide (TPABr). A second solution was prepared by dissolving 141 g of zinc sulfate (28.3% ZnO) in 500 ml of DI water. The resulting solution was added to the zirconium hydroxide slurry. Following addition, the pH of the slurry was reduced to 10.0 using sulfuric acid. The slurry was mixed for approximately 6 hours, then allowed to stand overnight. In the morning, the slurry was re-mixed, filtered and washed three times with DI water at 60° C. The final product was dried at 60° C. over the weekend. 200 g of the resulting powder was added to a V-blender along with 12.0 g of TEDA. The V-blender and contents were sealed, placed in an oven at 60° C. and rotated for two hours. The resulting powder was then formed into 12×30 mesh particles as described previously.

The above material was evaluated for its ability to remove cyanogen chloride as described previously, with the exception that a 1.5 cm deep bed, rather than a 2.0 cm deep bed, was employed. These results are presented below:

| TEDA Loading | [ClCN] | Linear Velocity | Bed Depth | RH | Breakthrough Time |
|---|---|---|---|---|---|
| 6% | 4,000 mg/m$^3$ | 9.6 cm/s | 1.5 cm | 80% | 23.7 minutes |

The above material was evaluated for its ability to remove hydrogen cyanide as described previously. These results are presented below. Cyanogen was not detected in the effluent stream. The lack of cyanogen formation is attributed to the stability of zinc(II) cyanide.

| TEDA Loading | [HCN] | Linear Velocity | Bed Depth | RH | Time HCN | Time $C_2N_2$ |
|---|---|---|---|---|---|---|
| 6% | 4,000 mg/m$^3$ | 9.6 cm/s | 2.0 cm | 50% | 53.4 min | Not detected |

The above materials were evaluated for their ability to remove sulfur dioxide as described previously. These results are presented below:

| TEDA Loading | [SO$_2$] | Linear Velocity | Bed Depth | RH | Breakthrough Time |
|---|---|---|---|---|---|
| 6% | 2,000 mg/m$^3$ | 9.6 cm/s | 1.5 cm | 80% | 54 minutes |

The above material was evaluated for its ability to remove fuming nitric acid from dry air (RH<5%). Dry air was employed to prevent condensation of HNO$_3$ vapors. Breakthrough occurred as HNO$_3$, rather than mixtures of NO and NO$_2$ (referred to collectively as NO$_x$). These results are presented below.

| TEDA Loading | [HNO$_3$] | Linear Velocity | Bed Depth | RH | Breakthrough Time |
|---|---|---|---|---|---|
| 6% | 2,000 mg/m$^3$ | 9.6 cm/s | 1.5 cm | <5% | 220 minutes |

The above material was evaluated for its ability to remove NO$_2$. Breakthrough occurred as NO, rather than NO$_2$. Results are presented below.

| TEDA Loading | [NO$_2$] | Linear Velocity | Bed Depth | RH | Breakthrough Time (as NO) |
|---|---|---|---|---|---|
| 6% | 1,000 mg/m$^3$ | 9.6 cm/s | 2.0 cm | 15% | 11 minutes |

Chlorine, Cl$_2$, breakthrough testing was as described in Example 2. Data are provided below:

| TEDA Loading | [Cl$_2$] | Linear Velocity | Bed Depth | RH | Breakthrough Time |
|---|---|---|---|---|---|
| 6% | 4,000 mg/m$^3$ | 9.6 cm/s | 2.0 cm | 15% | 37.1 minutes |

Example 8

Effects of Zinc Loading

Filtration media was prepared according to the procedure described in Example 7, with the exception that the zinc loading was varied between 7% and 30%. All materials were impregnated with 6% TEDA as described previously. All materials were prepared as 12×30 mesh particles.

Materials containing 7%, 14%, 20% and 30% ZnO-basis were evaluated for their ability to remove cyanogen chloride as described previously, with the exception that a 1.5 cm deep bed, rather than a 2.0 cm deep bed, was employed. These results are presented below:

| Zinc Loading (ZnO Basis) | [ClCN] | Linear Velocity | Bed Depth | RH | Breakthrough Time |
|---|---|---|---|---|---|
| 7% | 4,000 mg/m$^3$ | 9.6 cm/s | 1.5 cm | 80% | 13.5 minutes |
| 14% | 4,000 mg/m$^3$ | 9.6 cm/s | 1.5 cm | 80% | 21.0 minutes |
| 20% | 4,000 mg/m$^3$ | 9.6 cm/s | 1.5 cm | 80% | 23.7 minutes |
| 30% | 4,000 mg/m$^3$ | 9.6 cm/s | 1.5 cm | 80% | 16.9 minutes |

Materials containing 7%, 14%, 20% and 30% ZnO-basis were evaluated for their ability to remove hydrogen cyanide as described previously, with the exception that a 1.5 cm deep bed, rather than a 2.0 cm deep bed, was employed. These results are presented below. Cyanogen was not detected in the effluent stream. The lack of cyanogen formation is attributed to the stability of zinc(II) cyanide.

| Zinc Loading (ZnO Basis) | [HCN] | Linear Velocity | Bed Depth | RH | Time HCN | Time $C_2N_2$ |
|---|---|---|---|---|---|---|
| 7% | 4,000 mg/m$^3$ | 9.6 cm/s | 1.5 cm | 50% | 14.3 min | Not detected |
| 20% | 4,000 mg/m$^3$ | 9.6 cm/s | 1.5 cm | 50% | 30.4 min | Not detected |
| 30% | 4,000 mg/m$^3$ | 9.6 cm/s | 1.5 cm | 50% | 32.8 min | Not detected |

The invention claimed is:

1. A filtration material comprising porous zirconium hydroxide and at least one reactive moiety impregnated within the pores of said zirconium hydroxide, wherein said reactive moiety is selected from the group consisting of chromium hydroxide, cobalt hydroxide, copper hydroxide, iron (II) hydroxide, iron (III) hydroxide, molybdenum hydroxide, vanadium hydroxide, silver metal, silver oxide, silver hydroxide, and zinc hydroxide, or mixtures thereof, and said reactive moiety is between about 5% and about 40% by weight of said filtration material.

2. The filtration material of claim 1, further comprising an amine selected from the group consisting of triethylamine (TEA), quinuclidine (QUIN), triethylenediamine (TEDA), pyridine, and pyridine-4-carboxylic acid (P4CA).

3. The filtration material of claim 2, wherein said amine comprises triethylenediamine (TEDA) between about 0.5% and about 15% by weight of said filtration material.

4. The filtration media of claim 1, wherein the filtration media further comprises at least one alkali or alkaline earth metal.

5. The filtration media of claim 4, wherein said at least one alkali or alkaline earth metal is present in an amount up to about 5% by weight of said filtration media.

6. The filtration material of claim 1, wherein said at least one reactive moiety is impregnated within the pores of said porous zirconium hydroxide by a precipitation process.

* * * * *